Oct. 25, 1966  L. A. PARKINSON  3,280,838
VENT VALVE

Filed Oct. 28, 1964  3 Sheets-Sheet 1

INVENTOR.
LINDLEY A. PARKINSON
BY *Moore, White & Burd*
ATTORNEYS

Oct. 25, 1966   L. A. PARKINSON   3,280,838
VENT VALVE

Filed Oct. 28, 1964   3 Sheets-Sheet 2

INVENTOR.
LINDLEY A. PARKINSON
BY
Moore, White & Burd
ATTORNEYS

Oct. 25, 1966     L. A. PARKINSON     3,280,838
VENT VALVE

Filed Oct. 28, 1964     3 Sheets-Sheet 3

INVENTOR.
LINDLEY A. PARKINSON
BY Moore, White & Burd
ATTORNEYS

United States Patent Office 3,280,838
Patented Oct. 25, 1966

3,280,838
VENT VALVE
Lindley A. Parkinson, Anoka, Minn., assignor to Brown Steel Tank Company, Minneapolis, Minn., a corporation of Minnesota
Filed Oct. 28, 1964, Ser. No. 407,027
9 Claims. (Cl. 137—493.2)

This invention relates to a fluid pressure actuated valve unit and more particularly to an improved pressure actuated vent valve unit used on liquid transporting vehicle tanks to limit the gas pressure in the tanks and tank compartments.

It is the object of this invention to provide a small and compact valve unit having a plurality of fluid pressure actuated disc valves operable to permit gas to escape from and to enter a closed upright tank, to prevent leakage of liquid from the tank on surging of liquid therein, and to limit the flow of liquid from the tank should the tank be partially overturned or overturned while at the same time limit the internal fluid, gas and liquid, pressure in the tank.

Another object of the invention is to provide a vent valve having an unobstructed main passage whereby the valve unit has maximum fluid flow capacity with a minimum of size.

A further object of the invention is to provide a vent valve unit for a closed tank, the valve unit including an improved emergency pressure release valve having a large fluid flow capacity adapted to be opened in respose to excessive internal fluid pressure in the tank whereby this excessive fluid pressure is safely and quickly relieved.

A further object of this invention is to provide a pressure actuated vent valve unit with a vacuum relief or breather intake disc valve externally positioned on the valve unit body so as to be readily and easily cleaned and serviced with a minimum amount of time and effort.

Still another object of the invention is to provide a pressure actuated vent valve unit with an improved breather exhaust valve which effectively vents nominal gas pressure from a tank and moves to a liquid sealing position in response to slight flow of liquid past the exhaust valve even when the tank is partially overturned less than 90 degrees.

An additional object of the invention is a rugged and compact vent valve unit for use in a tank which is simple and economical in construction and reliable and effective in use.

Other objects of the invention will become apparent as the description proceeds.

To the accomplishment of the foregoing and related ends, this invention comprises the features hereinafter fully described and particularly pointed out in the claims. The following description sets forth in detail a particular illustrative embodiment of the invention, this being indicative, however, of but one of the various ways in which the principles of the invention may be employed.

Figure 1:
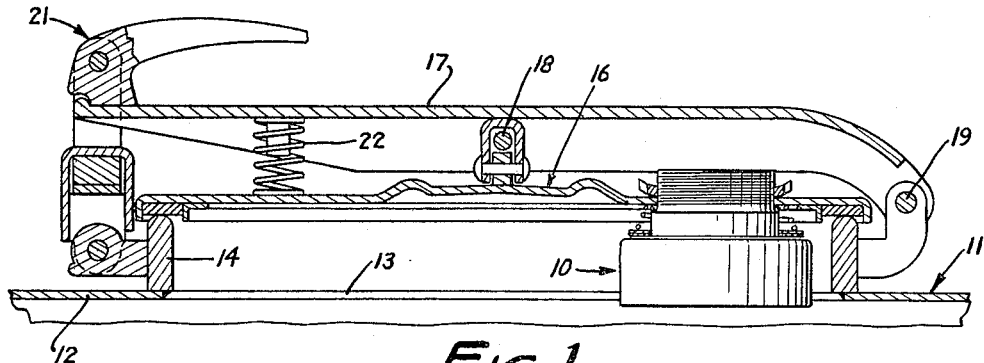
FIGURE 1 is a side view of the valve unit of this invention in assembled relation with a manhole cover shown in vertical section such as used on tank vehicles utilized for transporting liquids, as water, milk, gasoline and fuel oils.

Referring to the drawing, there is shown in FIGURE 1 the pressure actuated valve unit of this invention indicated generally at 10 in assembled relation with a closed tank 11 such as a vehicle tank commonly used for transporting liquids as water, milk, oil, or gasoline. The tank 11 is a conventional structure and is illustrated as having a top wall 12 formed with a manhole or filter opening 13. An annular upright flange 14 is secured to the top wall 12 and surrounds the opening 13. The top end of the flange 14 is closed with a manhole cover or closure 16 which carries the valve unit 10 so as to position the valve unit 10 inside of the tank in the area defined by the annular flange 14.

The periphery section of the cover 16 engages the upper edge of the flange 14 and is clamped into sealing engagement therewith by a strong arm 17 connected to the midportion of the closure 16 by a universal connection 18. One end of the strong arm 17 is hinged to the collar 14 by a pin 19. A clamp-type locking device 21 engages the opposite end of the strong arm 17 for securing it in cover closing position as shown in FIGURE 1. A spring 22 interposed between the cover 16 and strong arm 17 resiliently retains the cover 16 in operative relation to the arm 17

Figure 2:
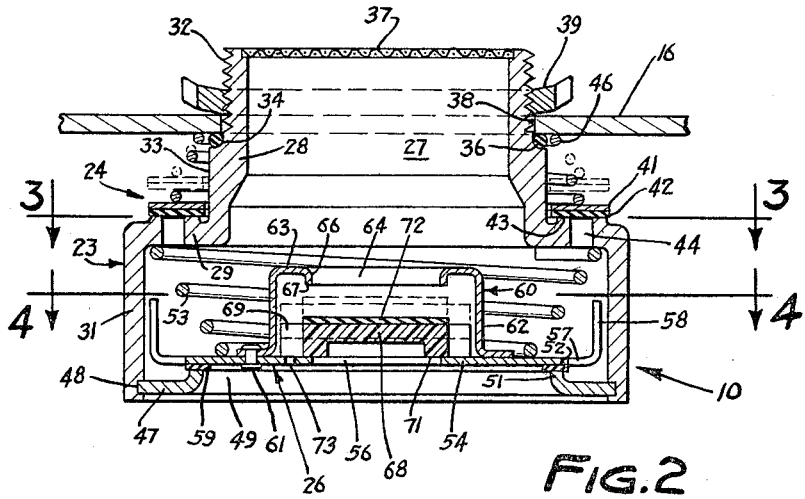
FIGURE 2 is an enlarged vertical sectional view of the valve unit of FIGURE 1 showing the valves thereof in their normal closed positions.
Figure 5:
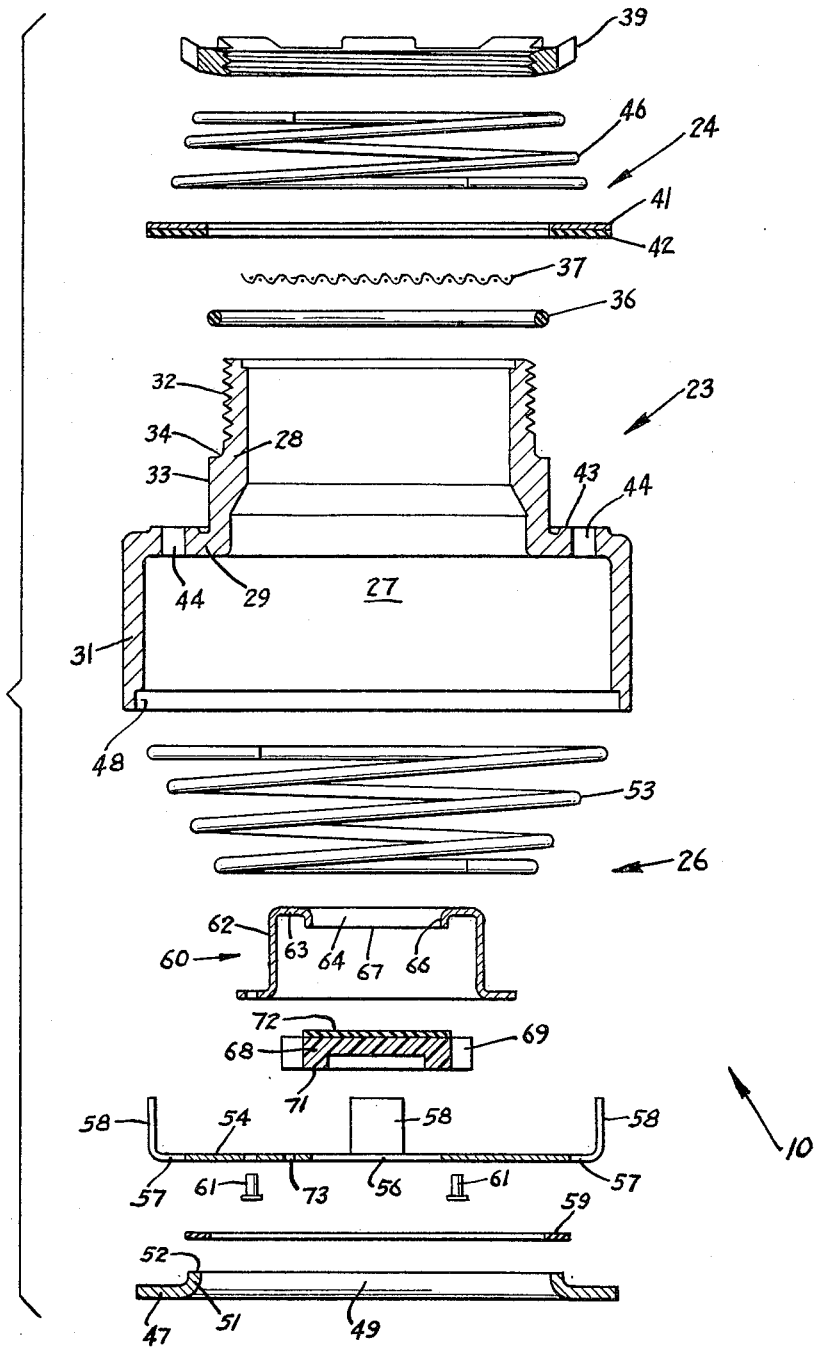
FIGURE 5 is an enlarged exploded view of the valve unit of FIGURE 1 with parts thereof in section.

As shown in FIGURES 2 and 5, the valve unit 10 generally comprises a bell-shaped tubular body 23 secured to the cover 16. A breather intake valve 24 positioned about the mid-section of the body 23 functions to permit the flow of air through the body 23 into the tank. Valve 24 opens in response to subatmospheric or vacuum pressure in the tank 11 caused by a change of the temperature of the gas and liquid in the tank or when liquid is withdrawn from the tank. Positive or superatmospheric fluid pressure in the tank is vented through a pressure release valve assembly 26 slidably disposed in the body 23. The valve assembly 26 functions to exhaust low pressure gas caused by the thermo expansion of the liquid in the tank an functions as an emergency valve to release excessive fluid pressures which may develop in the tank.

As shown in FIGURES 2 and 5, the tubular body 23 has a stepped axial passage 27 defined by the upper tubular section 28 joined with a radial outwardly directed shoulder 29 integral with a downwardly directed lower tubular section 31. The upper tubular section 28 has a threaded peripheral top portion 32 joined with a smooth cylindrical portion 33 by a curved annular step 34. The cylindrical portion 33 has a diameter which is slightly larger than the diameter of the threaded portion 32 so that the annular step 34 forms a seat for an O-ring seal 36. The top end of the tubular section 28 is open to the atmosphere and is provided with a suitable fire screen indicated generally at 37.

The body 23 is removably secured to the cover 16 to facilitate cleaning and repair of the breather intake valve 24 and the pressure release valve assembly 26. As shown in FIGURE 2, the threaded portion 32 of the body projects through a hole 38 in the cover 16. A nut 39 is threaded onto the portion 32 and engages the upper surface of the cover 16 to force the O-ring seal 36 into a sealing relation with the inside surface of the cover 16. With the body 23 in this position the shoulder 29 is spaced below the cover 16 to accommodate the valve 24.

Figure 3:
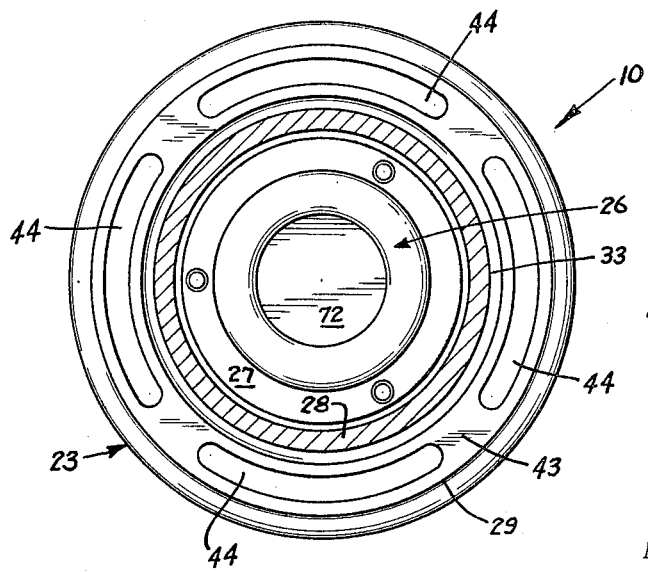
FIGURE 3 is a sectional view taken along the line 3—3 of FIGURE 2.

The intake valve 24 comprises an annular flat ring 41 of rigid plastic material and a flexible rubber annular gasket 42 positioned between the ring 41 and the top surface 43 of the shoulder 29. The top surface 43 is smooth and flat and forms a seat for the gasket 42. As shown in FIGURE 3, the radial shoulder 29 has a plurality of arcuate passages 44 open to the top surface 43 and the axial passage 27 of the body 23.

Referring to FIGURE 2, it is seen that the inside diameters of the ring 41 and the annular gasket 42 are slightly larger than the diameter of the smooth cylindrical body portion 33 so as to permit free axial movement of the ring and gasket while at the same time maintain the ring and gasket in alignment with the top surface 43. A conical shaped coil spring 46 is positioned about the cylindrical portion 33 at the body and engages the top of the flat ring 41 and the inner surface of the manhole cover 16 adjacent the hole 38. The spring 46 biases the rubber gasket 42 into sealing engagement with the top surface 43 of the shoulder to close the arcuate passages 44. On reduction of the fluid pressure in the tank below atmospheric pressure outside of the tank which may result from the change a temperature of the gas and liquid in the tank or a withdrawal of liquid from the tank the pressure, breather intake valve 24 opens as shown in broken lines in FIGURE 2 whereby air flows through the passage 27 and passages 43 into the tank. When the inside and outside pressures are substantially equal spring 46 will bias the flat gasket 42 and annular ring 41 to the closed position. Thus, the valve 24 is a pressure actuated one-way disc-type valve which functions to permit the flow of air into the tank and prevents the flow of air and liquid from the tank.

The pressure release valve assembly 26 is located in the large section of the axial passage 27 of the body 23 and is movable axially between the shoulder 29 and an annular ring 47. The peripheral portion of the ring 47 is positioned in an annular groove 48 located in the end portion of the body section 31. The ring 47 is secured to the body section 31 by turning over portions of the end of the body section 31 to clamp and seal the ring 47 in the annular groove 48. The ring 47 has a central opening 49 which is larger in diameter than the passage 27 in the upper tubular section 28 of the body. The opening 49 is defined by an annular upright flange 51 forming the inner edge of the ring 47. The top surface 52 of the flange 51 is smooth and flat and forms a seat for the valve assembly 26. A conical shaped spring 53 having a large end engageable with the shoulder 29 and a small end engageable with the valve assembly 26 biases the valve assembly 26 into engagement with the top surface 52 of the flange 51 to maintain the valve assembly 26 in a closed position.

Figure 4:
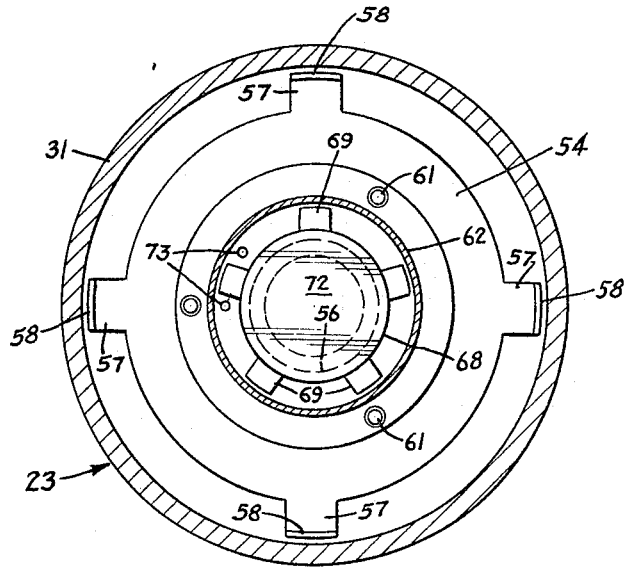
FIGURE 4 is a sectional view taken along the line 4—4 of FIGURE 2.

The pressure relief valve assembly 26 comprises a flat disc member 54 having a center opening 56 and a diameter larger than the diameter of the flange 51 of the ring 47. As shown in FIGURE 4, a plurality of circumferentially spaced arms 57 project from the peripheral section of the disc member 54 and terminate in upright fingers 58 positioned adjacent the inside wall of the lower tubular section 31. The fingers 58 function to guide the valve assembly 26 axially along the passage 27.

On movement of the valve assembly 26 to the open position in response to high fluid pressure in the tank the fingers 58 act as stops positioning the disc member 54 about midway between the shoulder 29 and the ring 47. The fingers 58 prevent the disc member 54 from being pushed by the high pressure in the tank to a position where the fluid escape flow would be restricted or even cut off.

The bottom side of the disc member 54 carries a flexible ring or gasket 59 of a rubber or flexible plastic material. The diameter of the ring 59 is substantially equal to the diameter of the annular flange 51. The ring 59 moves with the disc member 54 axially toward and away from the top surface 52.

As shown in FIGURE 2, the spring 53 biases the annular ring 59 into sealing engagement with the top surface 52 of the ring 47. When the pressure in the tank 11 reaches an excessive level the disc member 54 is moved upward against the biasing action of the spring 53 thereby providing fluid communication between the body passage 27 and the interior of the tank through the large opening 49 in the ring 47. The disc member 54 is an emergency valve which functions to provide the quick release of excessive fluid pressure in the tank 11 in that when it is moved to the open position a relatively large and unobstructed passage is created for the escape of gas or liquid from the tank. When the fluid pressure in the tank has been reduced to approximately the atmospheric pressure spring 53 biases the disc member 54 to a closed position seating the flexible ring 59 on the flat top surface 52 of the ring 47.

A cup-shaped cap indicated generally at 60 is positioned on top of the disc member 54 in axial alignment with the center opening 56 and secured thereto by a plurality of rivets 61. The cap 60 has an upright annular side wall 62 and an end wall 63 axially spaced from the disc member 54. The end wall 63 has a circular central opening 64 defined by a downwardly directed annular flange 66 having a flat bottom surface 67.

Figure 6:
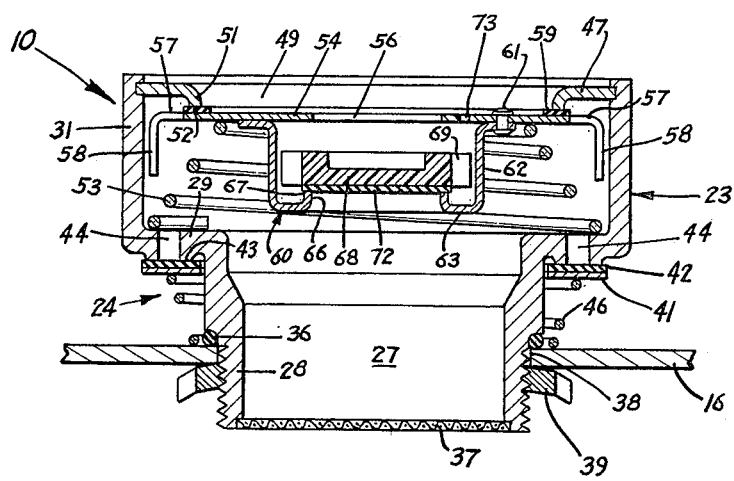
FIGURE 6 is a view similar to FIGURE 2 showing the valve unit in the inverted position with the valves thereof in their closed positions.

The cup-shaped cap 60 defines a chamber loosely confining a generally flat cup-shaped valve disc 68 formed from a light and strong plastic material. As shown in FIGURE 4, a plurality of circumferentially spaced radial projections 69 extend from the periphery of the valve disc 68 and terminate adjacent the annular side wall 62 of the cap to centralize the disc over the opening 56 and limit its movement along the common axis of the openings 56 and 64. The valve disc 68 has a diameter larger than the diameter of the openings 56 and 64. The bottom of the valve disc 68 has an annular flat surface 71 engageable with the top of the disc member 44 around the opening 56. A flexible flat gasket 72 of resilient rubber or plastic material is secured to the flat top of the valve disc 68. On movement of the disc 68 in an upward direction flexible gasket 72 engages the bottom surface 67 closing the center opening 64 in the cap 60. This completely closes the passage 27 as shown in FIGURE 6.

As shown in FIGURE 4, the disc member 54 has a pair of bleed holes 73 open into the cap 60 adjacent the periphery of the disc 68. The holes 73 serve as drain passages for liquid that may accumulate within the cap 60.

The valve disc 68 is normally held by gravity in engagement with the disc member 54 as shown in full lines in FIGURE 2. A nominal increase in the air pressure within the tank caused by expansion of the liquid in the tank moves the valve disc 68 in an upward direction away from the disc member 54 as shown in broken lines so as to provide a vent passage through the cup 60 for releasing gas to the atmosphere thereby maintaining the inside gas pressure substantially at an atmospheric level.

In normal operation the valve unit 10 is secured in an upright position to the cover 16 as shown in FIGURES 1 and 2. In this position the intake valve 24 and the valve disc 68 in the valve assembly 26 function to equalize nominal pressure differentials between the inside and outside of the tank caused by expansion and contraction of the gas and liquid stored in the tank.

A vacuum pressure in the tank 11 opens the valve 24 by moving the annular ring 41 together with the annular gasket 42 toward the cover 16 against the conical coil spring 46, thereby permitting the flow of air through the passage 27 and passages 44 in the tank. When the outside and inside pressures are substantially equal the spring 46 biases the members 41 and 42 to a closed position with the gasket 41 in a sealing relation with respect to the top surface 43 of the shoulder 29.

An increase in the pressure in the tank will raise the valve disc 68 permitting the gas in the tank to flow through the opening 56 around the disc 68 and through the openings 64 and 27 to the atmosphere. An excessive increase in the pressure in the tank will close the valve disc 68 by moving it into engagement with the bottom surface 67 of the flange 66. This increases the effective area of the disc member 54 exposed to the fluid pressure in the tank and results in movement of the disc member 54 against the force of the spring 53 opening the large emergency valve. Thus, the excessive fluid pressure is released from the tank on the movement of the entire valve assembly 26 from the top surface 52 of the annular ring flange 51. This provides maximum flow of gas or liquid through the passage 27 so as to quickly and effectively relieve the excessive pressure in the tank.

As shown in FIGURE 6, when the tank is in an overturned position the valve unit 10 is inverted. In this position the valve disc 68 is in sealing engagement with the end surface 67 of the cup flange 66 thereby preventing the flow of liquid through the body 23. The spring 46 biases the disc elements 41 and 42 of the valve 24 to a closed position thereby preventing the flow of liquid from the inverted tank. In the event of an excessive pressure increase in the tank the entire valve assembly 26 will be forced in a downward direction against the spring 53 thereby providing fluid communication between the passage 27 and the interior of the tank. As soon as the excessive pressure is relieved the spring 53 biases the valve assembly 26 in an upward direction thereby preventing excessive flow of liquid through the passage 27.

The valve unit 10 is effective in preventing the flow of liquid from the tank which has only been partially overturned as the valve disc 68 is loosely positioned in the cup 60 and is carried into sealing engagement with the end surface 67 of the flange 66 on slight movement of liquid through the cup 60. A slight pressure of liquid against the top of the valve disc 68 is sufficient to hold the flexible gasket 72 in engagement with the flange 66 as shown in FIGURE 6. Liquid in the tank cannot escape through the passages 44 as the coil spring 46 together with the pressure of the liquid maintains the valve 24 closed. The emergency disc member 54 is retained in a closed position by the coil spring 53 and only opens on an increase or a build-up of excessive pressure within the tank. This excessive pressure will open the disc valve 54 regardless of the angular position of the valve body 23 to release the excessive pressure in the tank.

In summary, the valve unit 10 of this invention is a compact assembly of three concentrically located disc-type valves operable to control the fluid pressure in a tank vehicle or similar closed liquid carrying containers. A vacuum release or breather intake valve 24 located about the exterior of the valve body operates to permit the entrance of air into the tank in response to a vacuum pressure in the tank. The valve 24 is a oneway disc-type valve normally biased by spring 46 to a closed position which prevents the flow of liquid or gas in the tank to the atmosphere. With the valve 24 located exteriorly of the valve housing 23 it is readily accessible for cleaning and repairing.

An increase of fluid pressure in the tank is controlled by a valve assembly 24 having a large emergency disc valve member 54 biased by spring 53 to a closed position and a smaller valve disc 68 carried by the disc valve member 54 in a guide cup 60. The valve assembly 24 is moved to an open position against the action of the spring 53 in response to excessive pressure in the tank. When the valve assembly 24 is in the open position the excessive fluid pressure is quickly relieved. The valve disc 68 is operable in response to nominal increases in fluid pressure in the tank to permit the escape of gas from the tank.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A valve unit for controlling the flow of fluid into a closed tank having closure means comprising (a) a body including a first tubular section and a second tubular section having a first passage, said second section being larger than the first section and secured to the first section with an outwardly directed radial shoulder, said shoulder having a flat annular top surface and at least one passage open to the first passage and open to the top surface, (b) means for securing the first section of the body to the closure means of the tank with the outer end of said first section and first passage open to the exterior of the tank and with the shoulder spaced from the inside of the closure means, (c) an annular disc valve surrounding the first section of the body and engageable with said top surface of the shoulder to close the opening therein, (d) means in contact with the annular disc valve and the top wall of the tank for biasing the disc valve into engagement with the shoulder, (e) an annular member having an opening and a seat circumventing the opening secured to the second tubular section at the open end thereof, (f) a valve assembly positioned in said first passage of the second tubular section for movement toward and away from the seat of said annular member, and (g) means for biasing said valve assembly into sealing engagement with said seat, (h) said valve assembly including an emergency disc valve biased into engagement with said seat and being moved away from said seat in response to excessive fluid pressure in said tank, said emergency disc valve having means for limiting movement of the emergency disc valve away from said seat, said last means engageable with said shoulder when excessive fluid pressure is in said tank to allow substantially unrestricted flow of fluid from said tank around said disc valve and an opening smaller than the opening in said annular member, a disc-type valve positioned over the opening in the emergency disc valve and a cup-shaped guide member positioned about the disc-type valve and secured to the emergency disc valve, said guide member having an end wall formed with an opening axially spaced from the disc-type valve so that movement of the disc-type valve from the emergency disc valve permits only fluid under nominal pressure to flow from the tank.

2. A valve unit operable to control the flow of liquid and gas from a closed tank comprising (a) a body having an internal wall forming an axial passage and a shoulder projected into the passage, said body being adapted for attachment to the tank with said passage open at one end to the interior of the tank and open at the opposite end to the exterior of the tank, (b) a member having an opening concentrically positioned in said passage below said shoulder and secured to an interior portion of the body, (c) a valve assembly concentrically positioned in said passage between said shoulder and said member for movement toward and away from said member to close and open the opening therein, (d) means engageable with the body and valve assembly for biasing the valve assembly toward said member to close the opening therein, said valve assembly being moved to open said opening in response to excessive liquid or gas pressure in the tank, and (e) said valve assembly including a first disc valve having an opening concentrically positioned in said passage and engageable with said biasing means, said first disc valve having a plurality of fingers located adjacent the internal wall of said body and extended toward said shoulder, said fingers being of a length such that when excessive fluid pressure is in said tank the fingers engage said shoulder positioning said disc valve to allow substantially unrestricted flow of fluid from said tank around said disc valve, and a second disc valve positioned to close the opening in the first disc valve member, and cup-shaped guide means positioned about said second disc valve and secured to the first disc valve, said guide means having an end wall formed with an opening axially spaced from the first disc valve, said second disc valve being movable into engagement with said end wall to close the opening therein in response to gas pressure in the tank during said movement of the second disc valve gas under nominal pressure in the tank flows through said valve assembly.

3. A valve unit for controlling the flow of fluid into a closed tank having closure means comprising
(a) a body including a first tubular section and a second tubular section having a first passage, said second section being larger than the first section secured to the first section with an outwardly directed radial shoulder, said shoulder having a flat annular top surface and at least one passage open to the first passage and said flat annular top surface,
(b) means for securing the first section of the body to the closure means of the tank with the outer end of said first section and first passage open to the exterior of the tank and with the shoulder spaced from the inside of the closure means,
(c) an annular disc valve surrounding the first section of the body and engageable with said flat annular top surface of the shoulder to close the opening therein,
(d) means in contact with the annular disc valve and the top wall of the tank for biasing the disc valve into engagement with the flat annular top surface of the shoulder, and
(e) means for closing the first passage at the end of the second section of said body.

4. The valve unit defined in claim 3 wherein said means for closing the first passage includes:
(a) a valve assembly having an emergency disc valve having an opening and disc-type valve carried by said emergency disc valve movable to open and close said opening in response to fluid pressure in said tank.

5. A valve unit for controlling the flow of fluid into a closed tank having closure means comprising
(a) a body including a tubular section having a passage open to the exterior of the tank and a radially directed shoulder having a flat annular top surface located in the interior of said tank and at least one hole open to said passage and to said top surface,
(b) means for securing the tubular section to the closure means with the passage open exteriorly of the tank and with the shoulder spaced from the inside of the closure means,
(c) an annular disc valve surrounding the tubular section and engageable with said flat annular top surface of the shoulder to close the hole therein, said disc valve being movable from said shoulder to open said hole in response to a vacuum pressure in said tank, and
(d) means engageable with the annular disc valve and the closure means for biasing the disc valve into engagement with the flat annular top surface of the shoulder.

6. The valve unit defined in claim 1 wherein said means for limiting movement of the emergency disc valve includes:
(a) fingers secured to said disc valve projected away from said seat, said fingers engageable with said shoulder to limit movement of the valve assembly to the open position whereby under excessive fluid pressure in the tank escape of fluid therefrom is substantially unrestricted.

7. The valve unit defined in claim 1 wherein said means for biasing the disc valve surrounding the first section of the body comprises a coil spring concentrically positioned about said first tubular section and engageable with the closure means and the top of the annular disc valve.

8. The valve unit defined in claim 6 wherein said fingers hold the valve assembly when in the open position about midway between the shoulder and the annular member.

9. The valve unit defined in claim 3 wherein said means for biasing the disc valve into engagement with the flat annular top surface of the shoulder comprises a coil spring concentrically positioned about said first tubular section of the body.

References Cited by the Examiner
UNITED STATES PATENTS

| | | | |
|---|---|---|---|
| 2,086,969 | 7/1937 | Strelow | 137—526 X |
| 2,349,137 | 5/1944 | Brown | 137—512.2 X |
| 2,865,531 | 12/1958 | Gorst et al. | 137—493.2 X |
| 3,145,724 | 8/1964 | Pelzer | 137—526 X |

M. CARY NELSON, *Primary Examiner.*

MARTIN P. SCHWADRON, *Examiner.*

R. J. MILLER, *Assistant Examiner.*